US009654953B2

(12) United States Patent
Bontu et al.

(10) Patent No.: US 9,654,953 B2
(45) Date of Patent: May 16, 2017

(54) METHOD AND APPARATUS FOR WIRELESS EMERGENCY ALERTS

(71) Applicant: BlackBerry Limited, Waterloo (CA)

(72) Inventors: Chandra Sekhar Bontu, Nepean (CA); Shalini Suresh Periyalwar, Waterloo (CA); James Earl Womack, Bedford, TX (US); Zhijun Cai, Herndon, VA (US)

(73) Assignee: BlackBerry Limited, Waterloo, Ontario (CA)

( * ) Notice: Subject to any disclaimer, the term of this patent is extended or adjusted under 35 U.S.C. 154(b) by 205 days.

(21) Appl. No.: 14/091,813

(22) Filed: Nov. 27, 2013

(65) Prior Publication Data

US 2015/0147995 A1    May 28, 2015

(51) Int. Cl.
| | |
|---|---|
| *H04M 11/04* | (2006.01) |
| *H04W 4/22* | (2009.01) |
| *H04W 4/02* | (2009.01) |
| *G08B 27/00* | (2006.01) |
| *G08B 21/10* | (2006.01) |
| *H04W 8/00* | (2009.01) |

(Continued)

(52) U.S. Cl.
CPC ........... *H04W 4/22* (2013.01); *G08B 27/001* (2013.01); *G08B 27/006* (2013.01); *H04W 4/02* (2013.01); *G08B 21/10* (2013.01); *H04W 8/005* (2013.01); *H04W 64/00* (2013.01); *H04W 76/007* (2013.01)

(58) Field of Classification Search
CPC ......... H04W 4/22; H04W 4/023; H04W 4/20; H04W 88/02; H04W 4/18; H04W 72/10; H04W 72/1247; H04W 76/007; H04W 8/18; H04W 4/02; H04W 4/021; H04W 48/16; H04W 4/06; H04W 4/046; H04L 67/306; H04L 63/0428; H04L 63/105; H04L 41/0609; H04L 63/107; H04L 63/16; H04M 3/5116; H04M 2242/04; H04M 2242/30; H04M 11/04; H04M 1/72536; H04M 3/5125; H04M 1/6066; H04M 2207/18
USPC ............................... 455/404.1, 404.2, 412.2
See application file for complete search history.

(56) References Cited

U.S. PATENT DOCUMENTS

| | | | | |
|---|---|---|---|---|
| 6,169,476 B1* | 1/2001 | Flanagan | ............... | G08B 21/10 |
| | | | | 340/286.02 |
| 2002/0160745 A1* | 10/2002 | Wang | ..................... | H04L 29/06 |
| | | | | 455/404.1 |

(Continued)

FOREIGN PATENT DOCUMENTS

| | | |
|---|---|---|
| EP | 2444946 | 4/2012 |
| EP | 2555503 | 2/2013 |

OTHER PUBLICATIONS

Wireless Emergency Alerts on Your Mobile Device; CTIA Consumer Info; http://www.ctia.org/consumer_info/safety/index.cfm/AID/12082, accessed Jun. 2013.

(Continued)

*Primary Examiner* — Nimesh Patel
(74) *Attorney, Agent, or Firm* — Fish & Richardson P.C.

(57) ABSTRACT

A method at a mobile device, including receiving, at the mobile device, an emergency alert message from a base station; determining a response is required for the emergency alert message; and sending the response to the base station.

28 Claims, 9 Drawing Sheets

(51) Int. Cl.
   *H04W 76/00*   (2009.01)
   *H04W 64/00*   (2009.01)

(56) References Cited

U.S. PATENT DOCUMENTS

| | | | | |
|---|---|---|---|---|
| 2009/0227224 A1* | 9/2009 | Aftelak | ............ | H04M 11/04 |
| | | | | 455/404.2 |
| 2009/0232107 A1* | 9/2009 | Park | ............ | H04B 7/2681 |
| | | | | 370/336 |
| 2011/0181443 A1* | 7/2011 | Gutierrez | ............ | G01C 21/3691 |
| | | | | 340/990 |
| 2012/0064855 A1 | 3/2012 | Mendelson | | |
| 2012/0276913 A1* | 11/2012 | Lim | ............ | H04W 12/08 |
| | | | | 455/450 |
| 2013/0036175 A1* | 2/2013 | Lau | ............ | G08B 27/001 |
| | | | | 709/206 |
| 2013/0201016 A1* | 8/2013 | Lo | ............ | G08B 27/006 |
| | | | | 340/502 |
| 2014/0051379 A1* | 2/2014 | Ganesh | ............ | H04W 4/22 |
| | | | | 455/404.1 |
| 2014/0064195 A1* | 3/2014 | Li | ............ | H04W 56/00 |
| | | | | 370/329 |

OTHER PUBLICATIONS

The CMAS Notification System; http://www.cmasalert.com/cmas.html, accessed Jun. 2013.

FCC 08-99: "Federal Communications Commission First Report and Order in the Matter of the Commercial Mobile Alert System," Apr. 9, 2008.

3GPP TS 22.268 V12.1.0, "Technical Specification Group Services and System Aspects;Public Warning System (PWS) requirements," Release 12, Dec. 2012.

Extended European Search Report issued in EP Application No. 14184277.3 on Apr. 15, 2015; 7 pages.

* cited by examiner

US 9,654,953 B2

METHOD AND APPARATUS FOR WIRELESS EMERGENCY ALERTS

FIELD OF THE DISCLOSURE

The present disclosure relates to wireless emergency alerts and in particular to the Commercial Mobile Alert System.

BACKGROUND

The Commercial Mobile Alert System (CMAS), also known as Wireless Emergency Alerts (WEA), is an alerting network designed to send emergency alerts to mobile devices within the coverage of a cellular base station (BS). In such systems various agencies may send alerts through participating wireless providers to customers using cellular networks. Various types of alerts may include alerts by the president, alerts involving threats to safety of life and Amber alerts, among others. In this way, important public safety announcements may be delivered through a cellular broadcast to devices capable of handling such messages.

However, while such announcements are generally broadcast to mobile devices in and around a disaster area or area affected by the alert, there is currently no way to detect the location of mobile device users. Further, the use of such system is not helpful in rescue operations in the event of a disaster.

BRIEF DESCRIPTION OF THE DRAWINGS

The present disclosure will be better understood with reference to the drawings, in which.

DETAILED DESCRIPTION OF THE DRAWINGS

The present disclosure provides a method at a mobile device comprising: receiving, at the mobile device, an emergency alert message from a base station; determining a response is required for the emergency alert message; and sending the response to the base station.

The present disclosure further provides mobile device comprising a processor, wherein the mobile device is configured to: receive an emergency alert message from a base station; determine a response is required for the emergency alert message; and send the response to the base station.

The adoption rate of wireless devices, including phones, pagers, smartphones, mobile devices, user equipment (UE), among others, has been high over the last decade, and the growth or adoption of such devices will continue to rise. In this regard, a majority of people living in an urban area carry such a device and such devices are equipped with a wide range of capabilities and applications.

Further, public safety is a topic of great interest to government bodies in many countries. For example, weather alerts may be issued in case of severe weather, such as tornado warnings, warnings about storms or flooding, among others. In other cases, abducted children may be the subject of an Amber alert.

Figure 1:
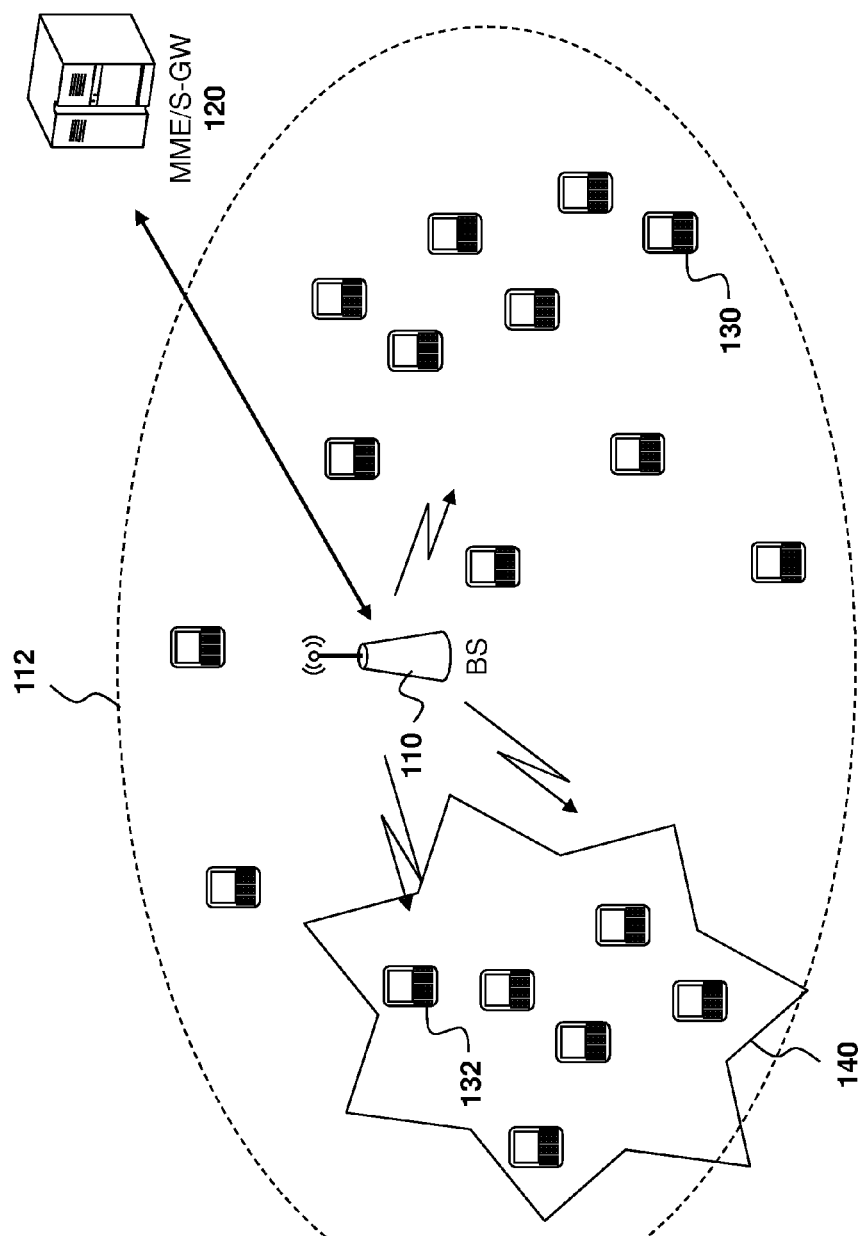
FIG. 1 is a block diagram showing a cellular wireless network supported public safety system.

Systems have been created to provide such alerts. Reference is now made to FIG. 1, which shows an example of an architecture for issuing alerts. As seen in FIG. 1, a base station 110 has a coverage area 112 and may communicate with a mobility management entity (MME) or serving gateway (SGW) 120. As used herein, a base station may include any macro or small cell base station, and may be part or any type of network architecture, including the Global System for Mobile Communications (GSM), Code Division Multiple Access (CDMA), Universal Mobile Telecommunications System (UMTS), Long Term Evolution (LTE), Long Term Evolution-Advanced (LTE-A), among others. As such, a based station may sometimes also be referred to as an evolved Node B (eNB).

Within coverage area 112, a plurality of mobile devices 130 and 132 are shown.

Under current emergency alert systems, the MME 120 may instruct multiple base stations, such as base station 110, within a geographical area to broadcast an emergency alert. Such emergency alerts may include Wireless Emergency Alerts (WEA) or a Commercial Mobile Alert System (CMAS).

However, announcements are generally broadcast to mobile phone users within the coverage area 112 and there is no way of limiting the alert to those devices within disaster area 140. Thus, as seen in FIG. 1, both mobile devices 130 that are outside of the disaster area and devices 132 which are within the disaster area receive the emergency alert.

The CMAS reference architecture is provided in FCC 08-99, "*Federal Communications Commission First Report and Order In the matter of The Commercial Mobile Alert System*", Apr. 9, 2008, the contents of which are incorporated herein by reference, and is referred to in FIG. 2 below. Specifically, referring to FIG. 2, the operation of the CMAS can be summarized as follows.

A wireless operator having a channel to public safety entities is the first to be informed and to subsequently inform mobile devices associated with base stations in proximity to the emergency condition. The solution utilizes collaboration between public safety central command (FEMA) and the wireless operator. The wireless operator delivers the message on a broadcast channel of a given tracking area or base station and the message is received by all mobile devices in that area.

CMAS employs, in one embodiment, a Common Alerting Protocol (CAP). CAP is an extensible mark-up language (XML) based messaging protocol that is the standard for all alerting messages across North America and beyond. The CAP message contains information such as the originating agency, the intended recipients, including the general public, first responders or law enforcement, among others, the degree of severity of the incident, the target area of the message and the alert message itself. CAP does not contain location coordinates and range of a disaster.

Figure 2:
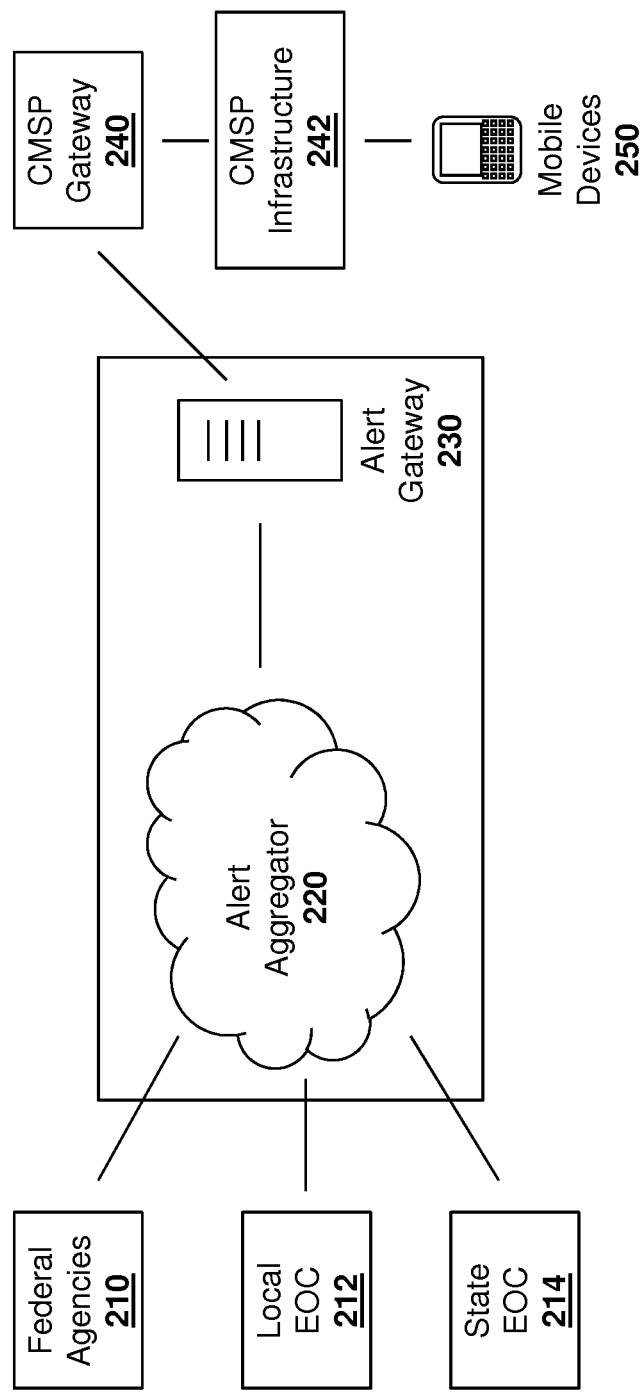
FIG. 2 is an architectural diagram of a typical CMAS system.

Thus, as seen in FIG. 2, federal agencies 210, local emergency operations centres (EOC) 212 or state emergency operation centres (EOC) 214 may communicate with an alert aggregator 220. Alert aggregator 220 may then provide alerts to an alert gateway 230 which then provides the alert to one or more commercial mobile service provider gateways 240.

Each commercial mobile service provider 240 uses its infrastructure 242 to provide alerts to mobile devices 250.

The CMAS protocols have been employed in some Third Generation Partnership Projects Standards bodies, including Third Generation Partnership Project (3GPP) Technical Specification (TS) 22.268, v.12.1.1.0, "*Technical Specification Group Services and System Aspects; Public Warning System (PWS)*" December 2012, the contents of which are incorporated herein by reference.

As indicated above, some existing cellular systems already support CMAS broadcasting when an emergency alert is received from an emergency management authority. However, the location of the device is still unknown to the network, particularly when the device is in an idle mode. As will be appreciated by those in the art, an idle mode device listens for pages but is not actively connected to a wireless network.

Further, existing WEA support in the cellular system is not helpful in rescue operations in the event of a disaster. There is no known method for the device to compute its proximity to a disaster area and then to alert a user with various options.

Accordingly, the present disclosure provides for the identification and use of the mobile phone and users' location and presence within a disaster area.

Device Location Reporting

Having knowledge of a mobile user's presence in a disaster area may be valuable to emergency services. Further, knowledge of a user's presence when the user is not able to make or receive calls may also be valuable, especially if the user may not be rescued over a period of time such as hours and there may be a likelihood that the mobile device loses its battery charge. Various embodiments described below provide for an enhanced disaster safety service from a wireless network operator or public safety service operator that can assist in improving the search and rescue operations.

In accordance with one embodiment of the present disclosure, upon receiving a WEA, the mobile phone may automatically, or upon receiving user authorization, transmit the broadcast WEA alert number and its own location (GPS or other) back to the public safety service provider. The response may be managed by the wireless operator or a third party. The information may then be forwarded by the server or entity to federal agencies managing disaster rescue operations.

In some embodiments, the response may be sent by any device within a mobile range of a base station. In other embodiments, the device may be able to compute its proximity to a disaster area if informed of the location coordinates and the range of the disaster area.

For device location reporting, in one alternative, upon receiving a WEA the mobile device automatically (or after user approval) transmits a broadcast WEA alert number and its own location to the network.

At the network, a public safety server may compute the proximity of each mobile device to the site of the disaster. The information may then be forwarded by the network to federal agencies managing disaster rescue operations. If the wireless network operator offers an emergency service response, the public safety server in the network may utilize the information to support such service.

The present embodiment requires minimal changes to mobile devices.

In accordance with one embodiment of the present disclosure, a SystemInformationBlockType12 (SIB-12) message, as defined in the 3GPP TS 36.331, "*3rd Generation Partnership Project; Technical Specification Group Radio Access Network; Evolved Universal Terrestrial Radio Access (E-UTRA); Radio Resource Control (RRC); Protocol specification (Release 11)*", v. 11.5.0, September 2013, the contents of which are incorporated herein by reference, may be modified. In one embodiment, a response flag may be added to the broadcast message, wherein the response flag indicates to a mobile device or user equipment that it needs to respond or not, to the broadcast message. The response may be transmitted over a cellular band or public safety band. The additional information about the transmission of the response may also be signaled. While the embodiments are described with regards to a SIB-12 message, other broadcast messages may be used and modified in a similar manner to that described herein.

Such modification is, for example, shown in Table 1 below in bold.

TABLE 1

Modification of SystemInformationBlockType12

| SystemInformationBlockType12-r9 ::= | SEQUENCE { |
|---|---|
| messageIdentifier-r9 | BIT STRING (SIZE (16)), |
| serialNumber-r9 | BIT STRING (SIZE (16)), |
| warningMessageSegmentType-r9 | ENUMERATED {notLastSegment, lastSegment}, |
| warningMessageSegmentNumber-r9 | INTEGER (0..63), |
| warningMessageSegment-r9 | OCTET STRING, |
| dataCodingScheme-r9 | OCTET STRING (SIZE (1)) |
| OPTIONAL, -- | |
| Cond Segment1 | |
| ResponseFlag | ENUMERATED {0, 1} |
| lateNonCriticalExtension | OCTET STRING    OPTIONAL, - |
| Need OP | |
| ... | |
| } | |
| -- ASN1STOP | |

TABLE 1-continued

Modification of SystemInformationBlockType12

SystemInformationBlockType12 field descriptions dataCodingScheme

Identifies the alphabet/coding and the language applied variations of a CMAS
notification. The octet (which is equivalent to the octet of the equivalent IE defined in
TS 36.413 [39, 9.2.1.52]) contains the octet of the equivalent IE defined in TS 23.041
[37, 9.4.2.2.4] and encoded according to TS 23.038 [38].
messageIdentifier Identifies the source and type of CMAS notification. The leading bit (which is
equivalent to the leading bit of the equivalent IE defined in TS 36.413 [39, 9.2.1.44])
contains bit 7 of the first octet of the equivalent IE, defined in and encoded according
to TS 23.041 [37, 9.4.1.2.2], while the trailing bit contains bit 0 of second octet of the
same equivalent IE.
serialNumber Identifies variations of a CMAS notification. The leading bit (which is equivalent to the
leading bit of the equivalent IE defined in TS 36.413 [39, 9.2.1.45]) contains bit 7 of
the first octet of the equivalent IE, defined in and encoded according to TS 23.041
[37, 9.4.1.2.1], while the trailing bit contains bit 0 of second octet of the same
equivalent IE.
warningMessageSegment Carries a segment of the Warning Message Contents IE defined in TS 36.413 [39].
The first octet of the Warning Message Contents IE is equivalent to the first octet of
the CB data IE defined in and encoded according to TS 23.041 [37, 9.4.2.2.5] and so
on.
warningMessageSegmentNumber Segment number of the CMAS warning message segment contained in the SIB. A
segment number of zero corresponds to the first segment, one corresponds to the
second segment, and so on.
warningMessageSegmentType Indicates whether the included CMAS warning message segment is the last segment
or not.
ResponseFlag

**Indicates whether the included CMAS warning message segment requires user
response or not.**

| Conditional presence | Explanation |
|---|---|
| Segment1 | The field is mandatory present in the first segment of SIB12, otherwise it is not present. |

As defined in Table 1 above, a response flag indicates whether the included CMAS warning message segment requires user response or not. The response flag allows the wireless network operator to determine whether a response from the mobile device is required or not, depending on the impact of the disaster or the type of disaster. For example, if a disaster is in a contained area, such as a building collapse, and the network is not likely to be overloaded with tens of thousands of responses, a flag may be set to request a response from a mobile device.

Figure 3:
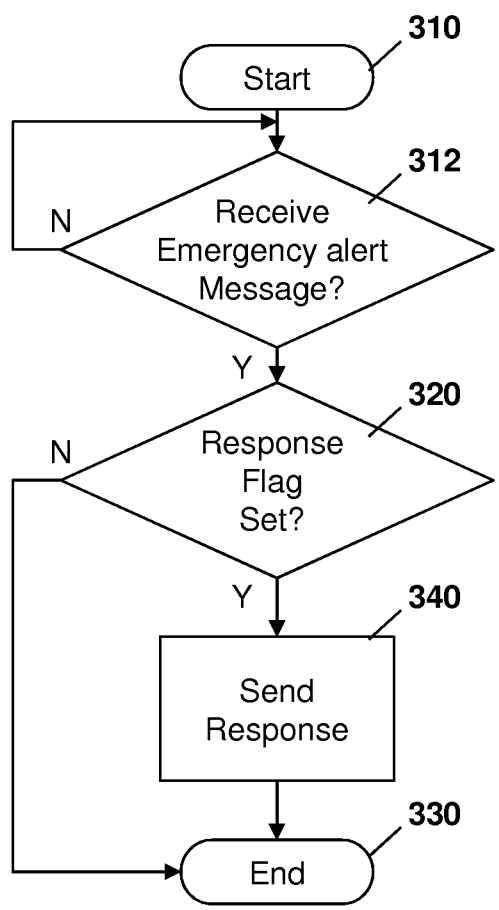
FIG. 3 is a flow diagram showing a process for sending a response to an emergency alert message based on a response flag.

The above is, for example, described with reference to FIG. 3. FIG. 3 shows a flow diagram which starts at block 310 and proceeds to block 312 in which a check is made to determine whether an emergency alert message is received. For example the message of block 312 may be a CMAS message, other broadcast message or even a dedicated message. If not, the process may continue to loop back to block 312 until an emergency alert message is received.

Once the emergency alert message is received, the process proceeds from block 312 to block 320 in which a check is made at the mobile device to determine whether a response flag is indicated or set within the emergency alert message. If no, the process proceeds to block 330 and ends.

Conversely, if a response flag is set, as determined by the check in block 320, the process proceeds to block 340 in which the mobile device sends a response to the network. Such response may include the message identifier or serial number from the broadcast message as well as the location of the mobile device, as determined at the mobile device. Various alternatives for the response at block 340 are described below.

From block 340, the process proceeds to block 330 and ends.

In some cases, setting a response flag in an emergency alert message may lead to a large number of responses, which may overwhelm a network. Thus, in an alternative embodiment, the device may determine its proximity to a disaster area and provide a response only if a response flag is set and also if the device is within proximity of the disaster area or meets other selection criteria. This may prevent, for example, tens of thousands of devices from responding to an emergency alert if the emergency is contained within a smaller area.

In one case, if the WEA message sent to a device contains the location coordinates of the disaster and the range of the disaster area, the device may compute its proximity to a disaster area with respect to its own location coordinates. A response may then be sent if the device is within a threshold proximity to the disaster. Such response may be automatic or based on user interaction. For example, a disaster support system in the device may offer the device owner the information and query the owner with options such as calling and/or messaging an emergency line, for example 911.

In this case, not all mobile devices (either connected or in idle mode) in the system, need to respond to the WEA broadcast.

Figure 4:
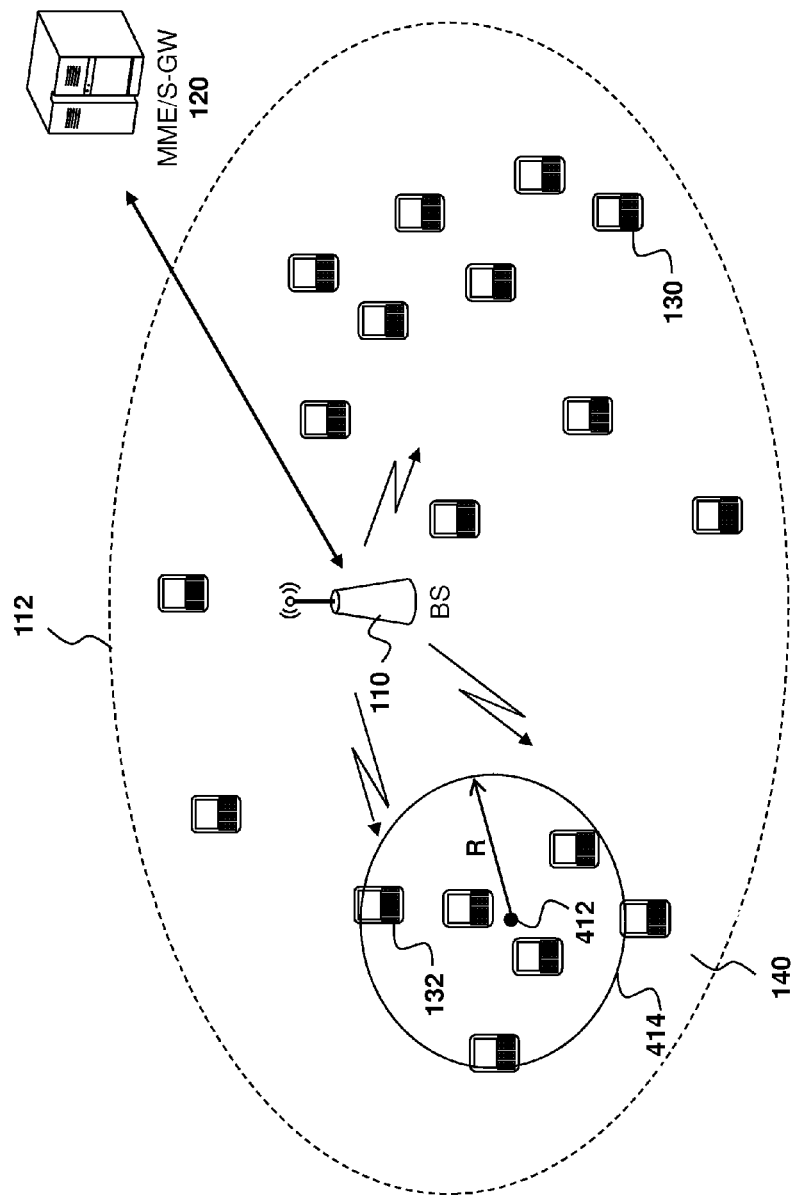
FIG. 4 is a block diagram showing a cellular wireless network supported public safety system in which a disaster area is identified.

Reference is now made to FIG. 4. As seen in FIG. 4, the embodiment of FIG. 1 has been modified such that an emergency alert message may include an epicenter 412 of the disaster area, as well as a disaster area radius 414 within the coverage area 112 of the base station 110. This is however merely one example of a way of defining a disaster area and other examples would be possible.

Reference is now made to Table 2, which shows amendments to the system information block type 12 from the 3GPP 36.331 specification. In particular, in Table 2 below, both a response flag, as well as an event descriptor, are included in the SIB-12 message. The event descriptor may be utilized by the mobile device to determine whether or not it needs to provide a response.

TABLE 2

| Modification of SystemInformationBlockType12 |
| --- |
| SystemInformationBlockType12-r9 ::=   SEQUENCE { <br>    messageIdentifier-r9         BIT STRING (SIZE (16)), <br>    serialNumber-r9              BIT STRING (SIZE (16)), <br>    warningMessageSegmentType-r9 ENUMERATED <br>               {notLastSegment, lastSegment}, <br>    warningMessageSegmentNumber-r9 INTEGER (0..63), <br>    warningMessageSegment-r9     OCTET STRING, <br>    dataCodingScheme-r9          OCTET STRING (SIZE (1)) <br>    OPTIONAL,   -- Cond Segment1 <br>    ResponseFlag                 ENUMERATED {0, 1} <br>    Event descriptor             BIT STRING (SIZE TBD) <br>    lateNonCriticalExtension     OCTET STRING <br>               OPTIONAL,   -- Need OP <br>    ... <br>} <br>-- ASN1STOP |

| SystemInformationBlockType12 field descriptions |
| --- |
| data CodingScheme |
| Identifies the alphabet/coding and the language applied variations of a CMAS notification. The octet (which is equivalent to the octet of the equivalent IE defined in TS 36.413 [39, 9.2.1.52]) contains the octet of the equivalent IE defined in TS 23.041 [37, 9.4.2.2.4] and encoded according to TS 23.038 [38]. <br> messageIdentifier |
| Identifies the source and type of CMAS notification. The leading bit (which is equivalent to the leading bit of the equivalent IE defined in TS 36.413 [39, 9.2.1.44]) contains bit 7 of the first octet of the equivalent IE, defined in and encoded according to TS 23.041 [37, 9.4.1.2.2], while the trailing bit contains bit 0 of second octet of the same equivalent IE. <br> serialNumber |
| Identifies variations of a CMAS notification. The leading bit (which is equivalent to the leading bit of the equivalent IE defined in TS 36.413 [39, 9.2.1.45]) contains bit 7 of the first octet of the equivalent IE, defined in and encoded according to TS 23.041 [37, 9.4.1.2.1], while the trailing bit contains bit 0 of second octet of the same equivalent IE. <br> warningMessageSegment |
| Carries a segment of the Warning Message Contents IE defined in TS 36.413 [39]. The first octet of the Warning Message Contents IE is equivalent to the first octet of the CB data IE defined in and encoded according to TS 23.041 [37, 9.4.2.2.5] and so on. <br> warningMessageSegmentNumber |
| Segment number of the CMAS warning message segment contained in the SIB. A segment number of zero corresponds to the first segment, one corresponds to the second segment, and so on. <br> warningMessageSegmentType |
| Indicates whether the included CMAS warning message segment is the last segment or not. <br> ResponseFlag |
| Indicates whether the included CMAS warning message segment requires user response or not. |

TABLE 2-continued

Modification of SystemInformationBlockType12

Event Descriptor

Provides parameters, such as a disaster location and a reporting radius around the disaster location, where devices within such reporting radius should provide a response. When this event is satisfied, UE shall send response to the network.

| Conditional presence | Explanation |
| --- | --- |
| Segment1 | The field is mandatory present in the first segment of SIB12, otherwise it is not present. |

As seen in Table 2, the event descriptor indicates parameters for providing a response. For example, the parameter may be a disaster location and a reporting radius. When the coordinates of the mobile device with respect to the disaster area are less than the reporting radius, the event is satisfied and the mobile device provides a response to the network. However, the location of the device is only one type parameter that may be within an event descriptor, and other types of parameters, such as the type of device, type of user, battery level of the device, received signal strength at the device, or any other parameter may be used to limit the number of responses to be sent by mobile devices within a network. An example of an event descriptor may be given by Equation 1 below.

$$|P_{UE} - P_{ec}| < R \qquad (1)$$

In Equation 1 above, $P_{UE}$ and $P_{ec}$ are the GPS coordinates representing the position of a mobile device and the epicentre of the disaster. The absolute value of $|P_{UE} - P_{ec}|$ represents the Euclidean distance between the mobile device and the epicentre of the disaster. R is a parameter that is defined as part of the event descriptor and thus the check represents a measure of proximity of the mobile device to the epicentre of the disaster area.

In general, various "measures of proximity", $f(P_{UE}, P_{ec})$ and a set of conditions can be defined.

In one embodiment, the base station or eNB may select an event descriptor from a list of event descriptors defined by the standards and indicate the event descriptor number and a set of corresponding parameters as part of the emergency alert message. Thus, the present disclosure is not limited to the event descriptors as described above with regard to Table 2 or the examples above with regard to Equation 1.

In particular, other event conditions may be provided, including radius or distance from the disaster, but may also include device type, battery level, conditions known to a device related to a user, signal strength, or other criteria that may be defined depending on the type of disaster and the type of response desired.

Figure 5:
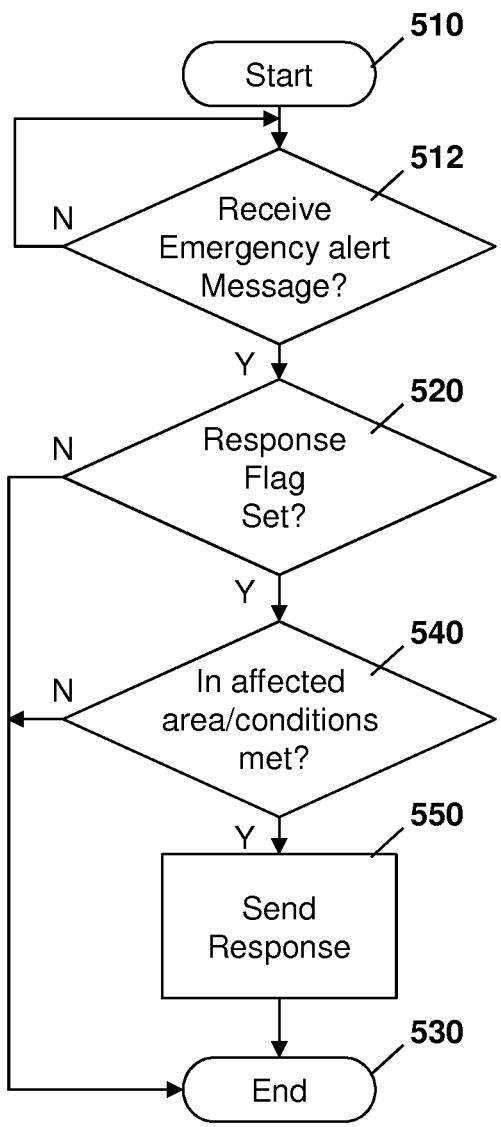
FIG. 5 is a flow diagram showing a process for sending a response to an emergency alert message based on a response flag and event conditions.

The event descriptor and response flag may be used by a mobile device to determine whether a response should be sent. Reference is now made to FIG. 5. The process of FIG. 5 starts at block 510 and proceeds to block 512 in which a check is made to determine whether an emergency alert message or broadcast has been received. If not, the process proceeds back to block 512 and continues to loop until an emergency alert message is received.

Once an emergency alert message is received, the process proceeds to block 520 in which a check is made to determine whether the response flag within the emergency alert message has been set. If not, the process proceeds to block 530 and ends.

From block 520, if the response flag is set in the emergency alert message, the process proceeds to block 540 in which a check is made at the mobile device to determine whether the mobile device meets the conditions provided in the event descriptor. For example, the check may be similar to the check of Equation 1 above or other check to determine whether or not the mobile device complies with various event descriptor parameters.

From block 540, if the device is not within the affected area and/or does not meet the event descriptor parameters, the process proceeds back to block 530 and ends.

Conversely, if the determination is made at block 540 that the mobile device is within the affected area and/or meets the event descriptor parameters, the process proceeds to block 550 and a response is sent back to the network. From block 550 the process proceeds to block 530 and ends.

Device/User Response

In accordance with the above, the device may send a response, such as the response sent at block 550 of FIG. 5 or block 340 of FIG. 3, if conditions are correct.

However, if all devices within the network area are required to respond if the response flag is set, as in the example of FIG. 3, all devices that are in idle mode may need to perform the initial steps of network entry and request uplink grant. Further connected mode devices may also need to request uplink grant. Such activity, within a short period of time after receipt of a broadcast message, may overwhelm the network uplink resources.

Accordingly, alternative responses may be used in accordance with some embodiments of the present disclosure. Further such a response may be different depending on whether the mobile device is in an active or an idle mode.

In one embodiment, mobile devices may transmit a random access channel (RACH) preamble-like code over radio resources which may be allocated in the SIB 12 message. Sequence selection and resource selection procedures may be optimized such that the mobile device transmission detection at the base station or eNB is maximized. The sequence and resource selection rule may be included in the SIB message as provided below. Also, the base station may indicate that the responses may be sent over public safety band and/or the cellular licensed bands in various embodiments.

In one example, devices that are in a connected state may be provided with a 1-1 mapping of each cellular-radio network temporary identifier (C-RNTI) to a WEA RACH preamble code and WEA RACH resource. The mapping may be defined in the SIB 12 message. For example, if the base station is an LTE base station, the evolved packet core (EPC) may inform eNBs to include such information in the emergency alert message upon receiving the WEA message from a government administered alert gateway. The eNB could allocate enough WEA RACH resources and WEA preambles to accommodate connected mobile devices. The emergency alert message may include a rule or look up table to indicate the mapping rule between the devices C-RNTI and the RACH configuration for WEA responses for each mobile device. Similar mappings may occur in other network technologies.

In another alternative, the connected device may request the uplink resource via the scheduling request channel (SR) and use the allocated resource to transmit the response. In another alternative, if SR channel is not available, the mobile device could use random access procedure for the uplink resource request and/or timing alignment.

The mobile device or user equipment should be able to uniquely identify the WEA RACH configuration with its C-RNTI in one embodiment.

Further, in some embodiments, the emergency alert message broadcast may also consist of a number of instance or time periods that the response is to be received.

For connected devices, the emergency alert message may for example be the system information block 12 of 3GPP TS 36.331 The technical specification may be modified in accordance with Table 3 below.

TABLE 3

Modification of SystemInformationBlockType12

| | |
|---|---|
| SystemInformationBlockType12-r9 ::= | SEQUENCE { |
| messageIdentifier-r9 | BIT STRING (SIZE (16)), |
| serialNumber-r9 | BIT STRING (SIZE (16)), |
| warningMessageSegmentType-r9 | ENUMERATED {notLastSegment, lastSegment}, |
| warningMessageSegmentNumber-r9 | INTEGER (0..63), |
| warningMessageSegment-r9 | OCTET STRING, |
| dataCodingScheme-r9 | OCTET STRING (SIZE (1)) |
| OPTIONAL,   -- Cond Segment1 | |
| ResponseFlag | ENUMERATED {0, 1} |
| Event descriptor | BIT STRING (SIZE TBD) |
| C-RNTI -to- WEA RACH preamble map | BIT STRING (SIZE TBD) |
| lateNonCriticalExtension | OCTET STRING |
| OPTIONAL,   -- Need OP | |
| ... | |
| } | |
| -- ASN1STOP | |

SystemInformationBlockType12 field descriptions dataCodingScheme

Identifies the alphabet/coding and the language applied variations of a CMAS notification. The octet (which is equivalent to the octet of the equivalent IE defined in TS 36.413 [39, 9.2.1.52]) contains the octet of the equivalent IE defined in TS 23.041 [37, 9.4.2.2.4] and encoded according to TS 23.038 [38].
messageIdentifier Identifies the source and type of CMAS notification. The leading bit (which is equivalent to the leading bit of the equivalent IE defined in TS 36.413 [39, 9.2.1.44]) contains bit 7 of the first octet of the equivalent IE, defined in and encoded according to TS 23.041 [37, 9.4.1.2.2], while the trailing bit contains bit 0 of second octet of the same equivalent IE.
serialNumber Identifies variations of a CMAS notification. The leading bit (which is equivalent to the leading bit of the equivalent IE defined in TS 36.413 [39, 9.2.1.45]) contains bit 7 of the first octet of the equivalent IE, defined in and encoded according to TS 23.041 [37, 9.4.1.2.1], while the trailing bit contains bit 0 of second octet of the same equivalent IE.
warningMessageSegment Carries a segment of the Warning Message Contents IE defined in TS 36.413 [39]. The first octet of the Warning Message Contents IE is equivalent to the first octet of the CB data IE defined in and encoded according to TS 23.041 [37, 9.4.2.2.5] and so on.
warningMessageSegmentNumber Segment number of the CMAS warning message segment contained in the SIB. A segment number of zero corresponds to the first segment, one corresponds to the second segment, and so on.
warningMessageSegmentType Indicates whether the included CMAS warning message segment is the last segment or not.
ResponseFlag Indicates whether the included CMAS warning message segment requires user response or not.

TABLE 3-continued

Modification of SystemInformationBlockType12

Event Descriptor

Provides parameters, such as a disaster location and a reporting radius around the disaster location, where devices within such reporting radius should provide a response. When this event is satisfied, UE shall send response to the network.
C-RNTI _to_ WEA-RACH preamble map Indicates the one-to-one mapping rule for WEA RACH preamble configuration based on the C-RNTI.

| Conditional presence | Explanation |
|---|---|
| Segment1 | The field is mandatory present in the first segment of SIB12, otherwise it is not present. |

As seen in Table 3 above, in addition to the response flag and the event descriptor, a C-RNTI-2-WEA RACH preamble map is provided. Such map indicates a 1-1 mapping rule for the WEA RACH preamble configuration based on the C-RNTI. In this case, each connected mobile device will have a unique WEA RACH preamble to use to provide the response with the location of the mobile device.

As will be appreciated by those in the art, the event descriptor is optional in the embodiment of Table 3. In some instances the event descriptor may not be included but merely a response flag as well as the preamble map.

Figure 6:
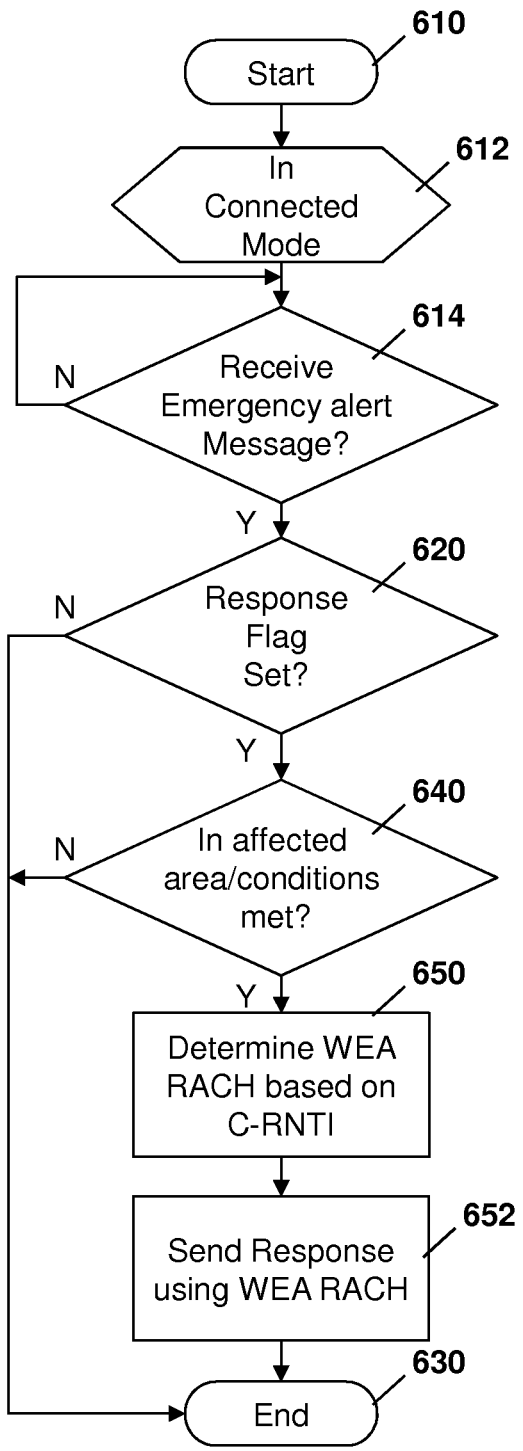
FIG. 6 is a flow diagram showing a process at a connected mobile device for determining uplink resources to send a response to an emergency alert message.

Reference is now made to FIG. 6, which shows the process diagram of FIG. 5 modified for the connected mode response. In particular, the process of FIG. 6 starts at block 610 and proceeds to block 612 in which a precondition is that the mobile device is in connected mode.

The process then proceeds to block 614 in which a check is made to determine whether an emergency alert message is received. If not, the process proceeds to loop back to block 614.

From block 614, if an emergency alert message is received, the process proceeds to block 620 in which a check is made to determine whether a response flag is set in the broadcast message. If no, the process proceeds to block 630 and ends.

From block 620, if the response flag is set, the process proceeds to block 640 in which a check is made to determine whether the UE or mobile device meets the event conditions (for example is in an affected area). If not, the process proceeds from block 640 to block 630 and ends.

If the device meets the event conditions as determined at block 640, the process proceeds to block 650 and determines the WEA RACH resources based on the C-RNTI of the device and based on the broadcast emergency alert message as received at block 614.

Once the mobile device has determined the WEA RACH resource, the process proceeds to block 652 in which the response is sent on the WEA RACH resource determined at block 650. From block 652 the process proceeds to block 630 and ends.

As will be appreciated, in some embodiments, the WEA RACH preamble is different from a normal RACH preamble for a device entering the system. This ensures that the messages received on the WEA RACH preamble are not merely messages for devices wishing to move from an idle to connected states.

For a device that is in an Idle state, such device does not have a C-RNTI. In this case, the device may instead be identified by the system architecture evolution (SAE)— temporary mobile station identifier (S-TMSI) and a broadcast message may have a mapping of the S-TMSI to a set of WEA-RACH preambles and WEA-RACH resources.

However, the S-TMSI is typically fairly large. In accordance with one embodiment of the present disclosure may be shortened. In an LTE environment, the EPC identifies the mobile devices which are in RRC_Idle mode within a tracking area related to the disaster location and decides a rule to map a group of shortened S-TMSIs to a set of WEA RACH preambles on a WEA RACH physical resource. The grouping is done in such a way that collisions are avoided typically.

The mobile device, on reading the event descriptor and on verifying the event trigger, identifies the WEA RACH resource from its shortened S-TMSI and then randomly selects a preamble from a set of preamble codes. The mobile device can transmit the selected preamble over the determined RACH resource.

A unique mobile device identifier or shortened derived mobile device identifier may be added to the transmission such that the mobile device can be uniquely identified within the network. For example, the mobile device identifier may be sent by modulating the WEA RACH preamble transmission with the mobile device identifier.

Mobile device identifiers such as the International Mobile Subscriber Identity (IMSI) may however be too long to transmit over a finite duration and instead a shortened mobile device identifier, $m_{short}$ may be derived from the S-TMSI in some cases. For example, Equation 2 may be used to provide a shortened S-TMSI.

$$m_{short} = (p - n_i) \bmod (n_i - n_{i+1}) \quad (2)$$

In Equation 2 above, p is the shortened S-TMSI of the mobile device; $n_i$ and $n_{i+1}$ represent the first and the last shortened S-TMSIs of ith S-TMSI range/bin.

Here the shortened S-TMSI consists of the M-TMSI part, for example the 32 Least Significant Bits of S-TMSI of the S-TMSI. The 8 Most Significant Bits of the S_TMSI indicates the MME Code (MMEC) which is the same for all mobile devices connected to the same MME.

The EPC sends a mapping rule or a look up table to those eNBs or base stations in the tracking area that are proximate to the location of the disaster. The eNB in turn then adds the WEA RACH resource information and broadcasts over SIB-12 in one example.

Typically, more than 90% of mobile device are in Idle mode in an exemplary cellular system. In order to accommodate all mobile devices transmitting preambles, other frequency bands, such as the public safety band or the Industrial, Scientific and Medical (ISM) band may be used opportunistically. The frequency band information may be included in the emergency alert message.

Reference is now made to Table 4 which shows the addition of the S-TMSI to the WEA RACH preamble map.

TABLE 4

Modification of SystemInformationBlockType12

```
SystemInformationBlockType12-r9 ::=         SEQUENCE {
    messageIdentifier-r9                     BIT STRING (SIZE (16)),
    serialNumber-r9                          BIT STRING (SIZE (16)),
    warningMessageSegmentType-r9             ENUMERATED {notLastSegment,
lastSegment},
    warningMessageSegmentNumber-r9           INTEGER (0..63),
    warningMessageSegment-r9                 OCTET STRING,
    dataCodingScheme-r9                      OCTET STRING (SIZE (1))
    OPTIONAL,   -- Cond Segment1
    ResponseFlag                             ENUMERATED {0, 1}
    Event descriptor                         BIT STRING (SIZE TBD)
    C-RNTI -to- WEA RACH preamble map        BIT STRING (SIZE TBD)
    S-TMSI -to- WEA RACH preamble map        BIT STRING (SIZE TBD)
    lateNonCriticalExtension                 OCTET STRING
    OPTIONAL,   -- Need OP
    ...
}
-- ASN1STOP
```

SystemInformationBlockType12 field descriptions dataCodingScheme

Identifies the alphabet/coding and the language applied variations of a CMAS notification. The octet (which is equivalent to the octet of the equivalent IE defined in TS 36.413 [39, 9.2.1.52]) contains the octet of the equivalent IE defined in TS 23.041 [37, 9.4.2.2.4] and encoded according to TS 23.038 [38].
messageIdentifier Identifies the source and type of CMAS notification. The leading bit (which is equivalent to the leading bit of the equivalent IE defined in TS 36.413 [39, 9.2.1.44]) contains bit 7 of the first octet of the equivalent IE, defined in and encoded according to TS 23.041 [37, 9.4.1.2.2], while the trailing bit contains bit 0 of second octet of the same equivalent IE.
serialNumber Identifies variations of a CMAS notification. The leading bit (which is equivalent to the leading bit of the equivalent IE defined in TS 36.413 [39, 9.2.1.45]) contains bit 7 of the first octet of the equivalent IE, defined in and encoded according to TS 23.041 [37, 9.4.1.2.1], while the trailing bit contains bit 0 of second octet of the same equivalent IE.
warningMessageSegment Carries a segment of the Warning Message Contents IE defined in TS 36.413 [39]. The first octet of the Warning Message Contents IE is equivalent to the first octet of the CB data IE defined in and encoded according to TS 23.041 [37, 9.4.2.2.5] and so on.
warningMessageSegmentNumber Segment number of the CMAS warning message segment contained in the SIB. A segment number of zero corresponds to the first segment, one corresponds to the second segment, and so on.
warningMessageSegmentType Indicates whether the included CMAS warning message segment is the last segment or not.
ResponseFlag Indicates whether the included CMAS warning message segment requires user response or not.
Event Descriptor Provides parameters, such as a disaster location and a reporting radius around the disaster location, where devices within such reporting radius should provide a response. When this event is satisfied, UE shall send response to the network.
S-TMSI __to__ WEA-RACH preamble map Indicates the one-to-one mapping rule for WEA RACH preamble configuration based on the S-TMSI. The WEA-RACH preamble configuration may include the carrier frequency.

| Conditional presence | Explanation |
| --- | --- |

TABLE 4-continued

Modification of SystemInformationBlockType12

| | |
|---|---|
| Segment1 | The field is mandatory present in the first segment of SIB12, otherwise it is not present. |

As indicated in Table 4 above, the S-TMSI to WEA RACH preamble map indicates a 1-1 mapping rule for the WEA RACH preamble configuration based on the S-TMSI. The WEA RACH preamble configuration may include the carrier frequency.

One example of a map that might be sent in the S-TMSI to WEA RACH preamble map is shown below with regard to Table 5.

TABLE 5

Mapping of S-TMSI to WEA RACH

| Shortened S-TMSI range | WEA-RACH preamble configuration |
|---|---|
| S-TMSI-n1 to S-TMSI-n2 | WEA-RACH-0, resource-0 (carrier frequency, Bandwidth etc.) |
| S-TMSI-n2 to S-TMSI-n3 | WEA-RACH-1, resource-0 (carrier frequency, Bandwidth etc.) |
| ... | ... |
| ... | ... |

As seen in Table 5 above, the range ($S_{TMSI_{n}}$, $S_{TMSI_{n1}}$) is dedicated such that the number of Idle mode mobile devices with their shortened S-TMSI falling within this range have a very low probability of collision when randomly selecting a preamble that is transmitted over the predetermined resource.

The user identifier included in the transmission is derived from the S-TMSI. For example the WEA User Equipment identifier included can be derived from a mobile device's S_TMSI in accordance with Equation 3 below.

$$\text{WEA UE ID} = \text{mod}(S\text{-TMSI}, M) \quad (3)$$

In Equation 3 above, M indicates the maximum S-TMSI bin size allowed such that $(S_{TMSI_{nM}} - S_{TMSI_{nM-1}}) \leq M$.

Thus, in accordance with the above, the idle mode UE can determine the RACH resource in order to send a response.

Figure 7:
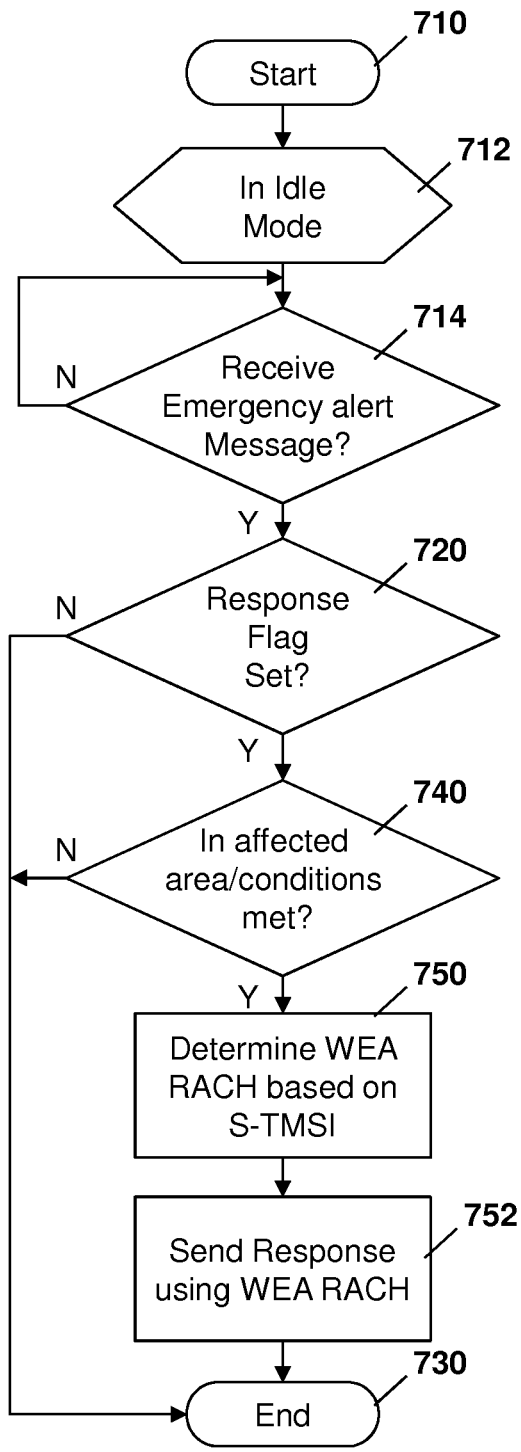
FIG. 7 is a flow diagram showing a process at an idle mobile device for determining uplink resources to send a response to an emergency alert message.

Reference is now made to FIG. 7, which shows a flow diagram similar to that of FIG. 6 but for idle mode mobile devices. In particular, the embodiment of FIG. 7 starts at block 710 and proceeds to block 712 in which a precondition is that the mobile device is in idle mode. A mobile device in idle mode will still listen to the broadcast messages for an SIB 12 message and thus, the process proceeds to block 714 in which a check is made to determine whether an emergency alert message has been received. If not, the process continues to loop back to block 714.

Once the emergency alert message has been received, as determined at block 714, the process proceeds to block 720 in which a check is made to determine whether a response flag was indicated within the emergency alert message. If no response flag was indicated then the process proceeds to block 730 and ends.

From block 720 the process proceeds to block 740 if a response flag is set. In the embodiment of FIG. 7, the emergency alert message further includes details of the emergency area and the mobile device may check whether or not it is in the affected area or other conditions are met, as shown by block 740. If the conditions are not met, the process proceeds to block 730 and ends.

Conversely, if the conditions are met the process proceeds to block 750 in which the WEA RACH resource is determined based on the shortened S-TMSI of the mobile device or UE.

The process then proceeds to block 752 in which the mobile device sends a response on the WEA RACH resource determined at block 750.

The process then proceeds to block 730 and ends.

While the above embodiments are described with regard to LTE, the present disclosure is not meant to be limited to LTE and other network architectures could equally be used.

Device Response without User Interaction

In some embodiments, due to privacy concerns, the user of the mobile device may need to physically consent to the response being sent back to the WEA. However, in some embodiments herein, after repeated requests that are ignored, the device or UE may respond to the WEA without user consent. Thus, for example, the emergency alert message may appear on the mobile device of the user along with a request to respond. If the user selects YES or NO to respond, the response is either sent or not sent depending on the user selection. However, if the user does not select YES or NO after a predetermined number of messages or broadcasts, or alternatively, after certain duration which is predefined or pre-configured, the device may assume that the user is incapable of sending a response and may send a response without such user consent. For example, in some cases the device, without user interaction, may automatically start transmitting a signal on a subcarrier, the signal may be a tone modulating a unique identifier. Such tone may be considered a locator beacon.

The configuration parameters for the subcarriers may be derived from information provided in the SIB-12 message. For example, the mapping rule between location of subcarriers, including carrier frequency, resource block and sub-carriers within the resource block, dedicated for this purpose and the C-RNTI or shortened S-TMSI may be indicated in the emergency alert message broadcast.

In one case, when a device starts transmitting over this narrow band, then most of the device functions may be inhibited by turning off the circuitry of the device excluding the circuitry required for such transmissions and further turning off protocol functionality. For example, a narrow band may be 15 kHZ and thus create very little battery drain. The turning off of this functionality enables the device to extend battery life and provide a signal for search and rescue operations. Such signal may help in locating the presence of the user of the device.

Further, a network may make sure that additional transmissions on such radio bearers within the disaster area are prohibited. For example a base station may not grant uplink transmission resources on such radio bearers.

Further, the transmit power for such rescued beacons may also be specified by the network in an emergency alert message. Since rescue beacon transmissions are expected to last for a long time, the radio bearers over which these transmissions are allowed are reserved for the purpose until the rescue operation is concluded.

Not every subcarrier within the resource block is used for the beacon transmission. To conserve battery power for the device, a carrier frequency drifts may be taken into account when assigning subcarriers. For example, if the carrier frequency drift is expected to be ±15 kHz, then every alternative subcarrier may be assigned for the rescue beacon transmission.

Alternatively, the device in this condition may periodically monitor the downlink signal. The monitoring may still use relatively little battery, but keeps a reasonable frequency offset which is significantly less than the spacing of the 15 kHz. For example, the drift may be limited in this way to ±150 Hz in one embodiment. However, the designation of 15 kHz or 150 Hz is merely meant as an example and other embodiments may be used.

Further, the receiving of a periodic downlink signal may also allow for the device to be contacted when relief services are close. The periodicity of the downlink signal monitor may be optimized for a required battery savings and frequency offset in some embodiments. Thus, for example, the downlink signaling may indicate the periodicity. If the rescue operations are still not close the period for monitoring may be long, whereas if rescue operations are approaching the location of the device then the downlink signal monitoring may be done more frequently in one embodiment.

Network resources for the resource blocks for rescue beacons may be reserved after an emergency broadcast. Alternatively, the resource blocks may be reserved only when it is determined that specific users are in the vicinity of the disaster area and are not responding to the network. Such a determination may be made, for example, by monitoring for rescue beacons over the resource blocks which are assigned for those devices. If those resource blocks are already assigned to other uplink transmissions, the network may appropriately control these transmit powers or use advanced signal processing techniques to extract such beacons.

Once it is determined that there is a beacon transmission on these resource blocks, the network may then stop uplink grants on those resource blocks. Other examples are possible.

The above therefore provides for the ability to provide network or emergency responders with locations of mobile devices or the number of mobile devices within a determined disaster area to provide for resource beacons that conserve battery life on a mobile device for non-responsive users.

In addition to automatically starting a rescue beacon in the event that a user is unresponsive, in further embodiments, a user may be also be given an option to activate the emergency beacon. Thus, even though the user is responsive, the user may not be able to leave an area and an emergency beacon may still be set in order to help rescue such user.

Other examples are possible.

The above may be implemented by any mobile devices and network elements.

Figure 8:
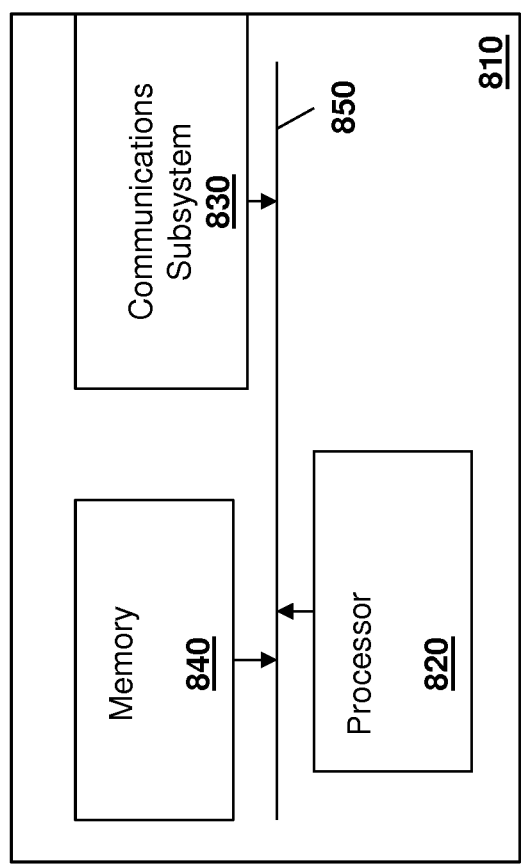
FIG. 8 is a simplified block diagram of a network element for use with the embodiments of the present disclosure.

In particular, the base stations in the embodiments above can be any network element, or part of any network element, including various network servers. Reference is now made to FIG. 8, which shows a generalized network element.

In FIG. 8, network element 810 includes a processor 820 and a communications subsystem 830, where the processor 820 and communications subsystem 830 cooperate to perform the methods of the embodiments described above.

Processor 820 is configured to execute programmable logic, which may be stored, along with data, on network element 810, and shown in the example of FIG. 8 as memory 840. Memory 840 can be any tangible storage medium.

Alternatively, or in addition to memory 840, network element 810 may access data or programmable logic from an external storage medium, for example through communications subsystem 830.

Communications subsystem 830 allows network element 810 to communicate with other network elements.

Communications between the various elements of network element 810 may be through an internal bus 850 in one embodiment. However, other forms of communication are possible.

Further, the above embodiments may be implemented by any mobile device. One exemplary device is described below with regard to FIG. 9.

Mobile device 900 is typically a two-way wireless communication device having voice and data communication capabilities. Mobile device 900 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a user equipment, or a data communication device, as examples.

Where mobile device 900 is enabled for two-way communication, it may incorporate a communication subsystem 911, including both a receiver 912 and a transmitter 914, as well as associated components such as one or more antenna elements 916 and 918, local oscillators (LOs) 913, and a processing module such as a digital signal processor (DSP) 920. As will be apparent to those skilled in the field of communications, the particular design of the communication subsystem 911 will be dependent upon the communication network in which the device is intended to operate.

Network access requirements will also vary depending upon the type of network 919. In some networks network access is associated with a subscriber or user of mobile device 900. A mobile device may require a removable user identity module (RUIM) or a subscriber identity module (SIM) card in order to operate on a network. The SIM/RUIM interface 944 is normally similar to a card-slot into which a SIM/RUIM card can be inserted and ejected. The SIM/RUIM card can have memory and hold many key configurations 951, and other information 953 such as identification, and subscriber related information.

Figure 9:
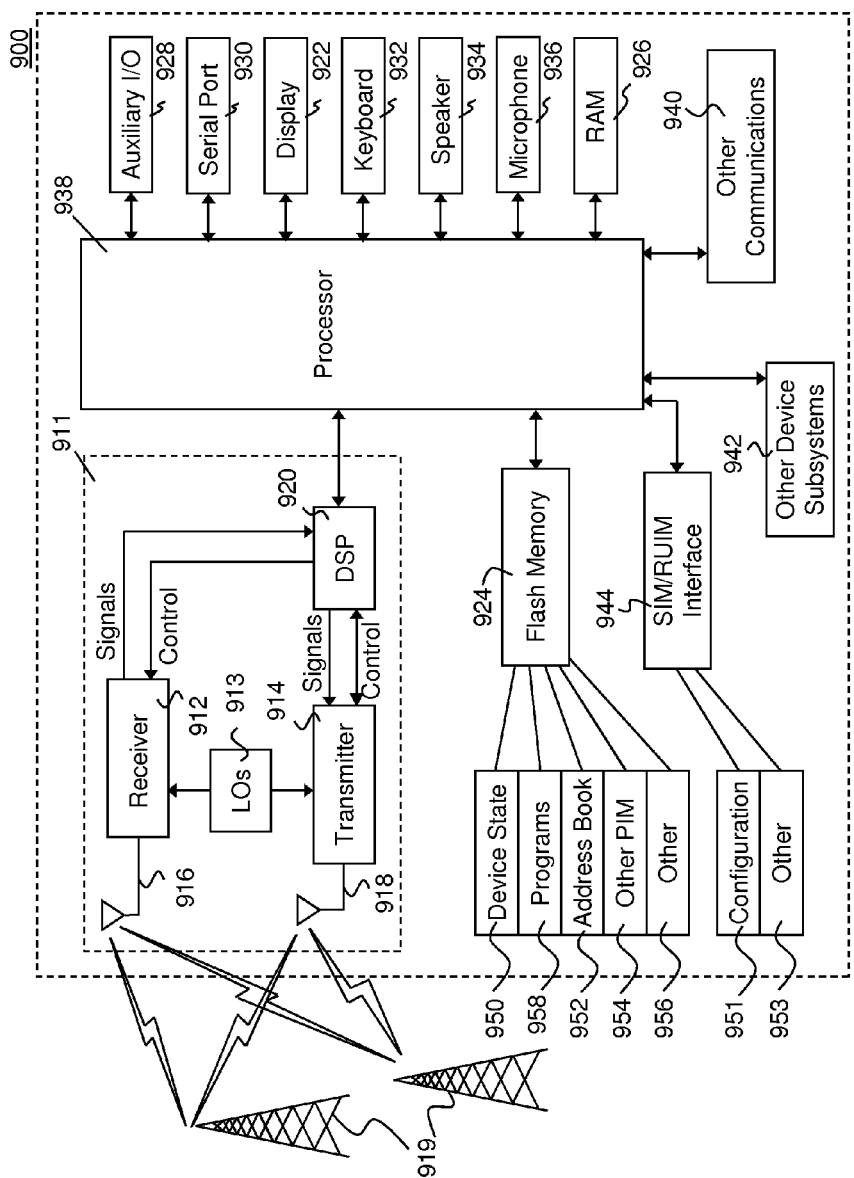
FIG. 9 is a block diagram of an example mobile device capable of being used with the embodiments of the present disclosure.

When required network registration or activation procedures have been completed, mobile device 900 may send and receive communication signals over the network 919. As illustrated in FIG. 9, network 919 can consist of multiple base stations communicating with the mobile device.

Signals received by antenna 916 through communication network 919 are input to receiver 912, which may perform such common receiver functions as signal amplification, frequency down conversion, filtering, channel selection and the like. A/D conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analog conversion, frequency up conversion, filtering, amplification and transmission over the communication network 919 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

Mobile device 900 generally includes a processor 938 which controls the overall operation of the device. Communication functions, including data and voice communications, are performed through communication subsystem 911. Processor 938 also interacts with further device subsystems such as the display 922, flash memory 924, random access memory (RAM) 926, auxiliary input/output (I/O) subsystems 928, serial port 930, one or more keyboards or keypads 932, speaker 934, microphone 936, other communication subsystem 940 such as a short-range communications subsystem and any other device subsystems generally designated as 942. Serial port 930 could include a USB port or other port known to those in the art.

Some of the subsystems shown in FIG. 9 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the processor 938 may be stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926.

As shown, flash memory 924 can be segregated into different areas for both computer programs 958 and program data storage 950, 952, 954 and 956. These different storage types indicate that each program can allocate a portion of flash memory 924 for their own data storage requirements. Processor 938, in addition to its operating system functions, may enable execution of software applications on the mobile device. A predetermined set of applications that control basic operations, including at least data and voice communication applications for example, will normally be installed on mobile device 900 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

Various applications may be loaded onto the mobile device 900 through the network 919, an auxiliary I/O subsystem 928, serial port 930, short-range communications subsystem 940 or any other suitable subsystem 942, and installed by a user in the RAM 926 or a non-volatile store (not shown) for execution by the processor 938. Such flexibility in application installation increases the functionality of the device and may provide enhanced on-device functions, communication-related functions, or both. For example, secure communication applications may enable electronic commerce functions and other such financial transactions to be performed using the mobile device 900.

In a data communication mode, a received signal such as a text message or web page download will be processed by the communication subsystem 911 and input to the processor 938, which may further process the received signal for output to the display 922, or alternatively to an auxiliary I/O device 928.

A user of mobile device 900 may also compose data items such as email messages for example, using the keyboard 932, which may be a complete alphanumeric keyboard or telephone-type keypad, either virtual or real, among others, in conjunction with the display 922 and possibly an auxiliary I/O device 928. Such composed items may then be transmitted over a communication network through the communication subsystem 911.

For voice communications, overall operation of mobile device 900 is similar, except that received signals would typically be output to a speaker 934 and signals for transmission would be generated by a microphone 936. Alternative voice or audio I/O subsystems, such as a voice message recording subsystem, may also be implemented on mobile device 900. Although voice or audio signal output is generally accomplished primarily through the speaker 934, display 922 may also be used to provide an indication of the identity of a calling party, the duration of a voice call, or other voice call related information for example.

Serial port 930 in FIG. 9 may be implemented in a personal digital assistant (PDA)-type mobile device for which synchronization with a user's desktop computer (not shown) may be desirable. Such a port 930 would enable a user to set preferences through an external device or software application and would extend the capabilities of mobile device 900 by providing for information or software downloads to mobile device 900 other than through a wireless communication network. The alternate download path may for example be used to load an encryption key onto the device through a direct and thus reliable and trusted connection to thereby enable secure device communication. As will be appreciated by those skilled in the art, serial port 930 can further be used to connect the mobile device to a computer to act as a modem or to a charger for charging.

Other communications subsystems 940, such as a short-range communications subsystem, is a further optional component which may provide for communication between mobile device 900 and different systems or devices, which need not necessarily be similar devices. For example, the subsystem 940 may include an infrared device and associated circuits and components or a Bluetooth™ communication module to provide for communication with similarly enabled systems and devices. Subsystem 940 may further include non-cellular communications such as WiFi or WiMAX, or near field communications.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a mobile device comprising:
 receiving, at the mobile device, a wireless emergency alert message from a base station, including location coordinates, and a range of a disaster area, the wireless emergency alert message including a response flag to indicate whether a response is required, and a wireless network sets the response flag;
 computing by the mobile device a proximity to the disaster area;

determining by the mobile device from the response flag in the wireless emergency alert message that a response is required to the emergency alert message;

determining from the wireless emergency alert message a radio resource allocated to the mobile device; and sending the response to the base station, on the radio resource allocated in the wireless emergency alert message, when the proximity computed by the mobile device is within the disaster area.

2. The method of claim 1, further including determining from the wireless emergency alert message whether event conditions are to be determined by the mobile device, the event conditions being specified in the received wireless emergency alert message.

3. The method of claim 2, wherein the determining further comprises checking whether the determined event conditions in the wireless emergency alert message are satisfied.

4. The method of claim 3, wherein the event conditions include a location area, and wherein the event conditions are satisfied if the mobile device is within the location area.

5. The method of claim 1, wherein the response includes a location of the mobile device.

6. The method of claim 1, further comprising prompting a user prior to the sending the response.

7. The method of claim 6, further comprising transmitting an emergency beacon from the mobile device if no user interaction is detected after a threshold number of prompts.

8. The method of claim 7, wherein the emergency beacon is a narrow band signal on a subcarrier.

9. The method of claim 8, wherein a signal tone modulates a unique identifier for the mobile device.

10. The method of claim 7, wherein the mobile device further shuts down all functionality apart from the functionality required for the emergency beacon.

11. The method of claim 1, wherein the wireless emergency alert message includes a mapping for an identifier of the mobile device and an uplink resource to use for the response.

12. The method of claim 11, wherein the identifier is a cell radio network temporary identifier for connected mobile devices.

13. The method of claim 11, wherein the identifier is a shortened system architecture evolution temporary mobile station identifier (S-TMSI) for an idle mode mobile device.

14. The method of claim 13, wherein the response includes an identifier for the mobile device.

15. A mobile device comprising a processor, wherein the mobile device is configured to:

receive a wireless emergency alert message from a base station, including location coordinates and a range of a disaster area, the wireless emergency alert message including a response flag to indicate whether a response is required, and a wireless network sets the response flag;

compute by the mobile device a proximity to the disaster area;

determine by the mobile device from the response flag in the wireless emergency alert message that a response is required to the wireless emergency alert message;

determine from the wireless emergency alert message a radio resource allocated to the mobile device; and send the response to the base station, on the radio resource allocated in the wireless emergency alert message, when the proximity computed by the mobile device is within the disaster area.

16. The mobile device of claim 15, wherein the mobile device is further configured to determine from the wireless emergency alert message whether event conditions are to be determined by the mobile device, the event conditions being specified in the received wireless emergency alert message.

17. The mobile device of claim 16, wherein the mobile device is further configured to determine by checking whether the determined event conditions in the wireless emergency alert message are satisfied.

18. The mobile device of claim 17, wherein the event conditions include a location area, and wherein the event conditions are satisfied if the mobile device is within the location area.

19. The mobile device of claim 15, wherein the response includes a location of the mobile device.

20. The mobile device of claim 15, wherein the mobile device is further configured to prompt a user prior to the sending the response.

21. The mobile device of claim 20, wherein the mobile device is further configured to transmit an emergency beacon if no user interaction is detected after a threshold number of prompts.

22. The mobile device of claim 21, wherein the emergency beacon is a narrow band signal on a subcarrier.

23. The mobile device of claim 22, wherein a signal tone modulates a unique identifier for the mobile device.

24. The mobile device of claim 21, wherein the mobile device is further configured to shut down all functionality apart from the functionality required for the emergency beacon.

25. The mobile device of claim 15, wherein the wireless emergency alert message includes a mapping for an identifier of the mobile device and an uplink resource to use for the response.

26. The mobile device of claim 25, wherein the identifier is a cell radio network temporary identifier for connected mobile devices.

27. The mobile device of claim 25, wherein the identifier is a shortened system architecture evolution temporary mobile station identifier (S-TMSI) for an idle mode mobile device.

28. The mobile device of claim 27, wherein the response includes an identifier for the mobile device.

* * * * *